US007058715B2

(12) United States Patent
Jain et al.

(10) Patent No.: US 7,058,715 B2
(45) Date of Patent: Jun. 6, 2006

(54) MANAGING ACCESS CONTROL WITHIN SYSTEM TOPOLOGIES USING CANONICAL ACCESS CONTROL REPRESENTATIONS

(75) Inventors: Amit Jain, Portland, OR (US); Sunil K. Nagarajrao, Portland, OR (US); Sunil J. Unadkat, Portland, OR (US); Stuart A. Friedberg, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/063,986

(22) Filed: May 31, 2002

(65) Prior Publication Data

US 2003/0225896 A1  Dec. 4, 2003

(51) Int. Cl.
*G06F 15/173* (2006.01)
*G06F 15/16* (2006.01)
*G06F 17/30* (2006.01)

(52) U.S. Cl. ............................ 709/225; 709/229; 707/9

(58) Field of Classification Search ................ 709/203, 709/216–221, 223–226, 229; 707/202, 9; 715/734
See application file for complete search history.

(56) References Cited

U.S. PATENT DOCUMENTS

| | | | | |
|---|---|---|---|---|
| 5,600,831 A | * | 2/1997 | Levy et al. | 707/2 |
| 5,862,339 A | * | 1/1999 | Bonnaure et al. | 709/227 |
| 6,148,330 A | * | 11/2000 | Puri et al. | 709/217 |
| 6,463,470 B1 | * | 10/2002 | Mohaban et al. | 709/223 |
| 6,675,261 B1 | * | 1/2004 | Shandony | 711/121 |
| 6,704,873 B1 | * | 3/2004 | Underwood | 713/201 |
| 6,741,999 B1 | * | 5/2004 | Wagner | 707/103 Y |
| 6,816,871 B1 | * | 11/2004 | Lee | 707/104.1 |

\* cited by examiner

*Primary Examiner*—Ario Etienne
*Assistant Examiner*—El Hadji M. Sall
(74) *Attorney, Agent, or Firm*—Abdy Raissinia

(57) ABSTRACT

Managing access control within system topologies by using canonical access control representations is disclosed. A set of accessor-accessible pairs is determined. Each accessor has a predetermined level of access to its paired accessible within a system topology. For each unique accessible within the set of pairs, the accessors that are paired with it are sorted and merged as a first proto-zone. For each unique subset of accessor(s) within the set of first proto-zones, the accessibles that are associated with it are sorted and merged as a second proto-zone. The second proto-zones are sorted to yield a canonical set of zones. Each zone has accessor(s) and accessible(s). The canonical set of zones is used to manage the access control of the accessors and the accessibles within the topology.

20 Claims, 7 Drawing Sheets

MANAGING ACCESS CONTROL WITHIN SYSTEM TOPOLOGIES USING CANONICAL ACCESS CONTROL REPRESENTATIONS

BACKGROUND OF INVENTION

This invention relates generally to system topologies, such as those of storage-area networks (SANs), and more particularly to managing access control within such system topologies.

Storage-area networks (SANs) are becoming more plentiful within large networking environments that have large storage needs. A SAN typically connects multiple servers to a centralized pool of disk storage. The SAN usually allows data transfers among computers and disks to occur at the same high peripheral channel speeds as if the computers and disks were directly attached to one another. For instance, fiber channel (FC) and small computer system interface (SCSI) technologies may be used for connecting the computers and the disks.

For SANs and other types of system topologies, an important issue is the management of access control among the topologies. Managing access control includes deriving, realizing, and/or comparing access control among consumers of resources and the resources themselves. In the case of SANs, the consumers may be the computers, or clients or servers, that read data from and write data to the SAN disks, whereas the resources may be the disks themselves. The term accessor is used to mean a consumer of resources within a system topology, and the term accessible is used to mean a resource within a system topology.

Access control ensures that accessors can properly access accessibles. Within complicated and sophisticated SANs, for instance, there may a number of different methods by which access control can be implemented. In a FC switch-based SAN fabric, computer operating system (OS) filter drivers, SCSI logical unit number (LUN) masking, and fabric zoning may all be used as different access control methods between accessors and accessibles. A given accessor may be permitted to access a given accessible by zero or more of such access control methods.

As SANs become more complicated and sophisticated, management of their access control also becomes more complicated. SAN administrators and systems may wish to view the current state, or snapshot, of access control among accessors and accessibles within the SAN. They may wish to compare one access control snapshot with another such snapshot, to learn the differences among these configurations. They may also wish to restore the current access control configuration to a previously saved access control configuration.

However, current solutions to these needs have shortcomings. The snapshots obtained are typically not repeatable. That is, obtaining consecutive access control snapshots of a SAN or other system topology whose accessibility is unchanging may nevertheless yield different results. This and other shortcomings make for less than desirable configuration comparisons, for instance. Differences between configurations may be reported even where none exist. Spurious differences may be reported. As a result, restoring a current configuration to a previously saved configuration may be difficult, or impossible. Also, such a solution can involve making more changes to the current configuration during the restore than needed, which may be undesirable.

For these described reasons, as well as other reasons, there is a need for the present invention.

SUMMARY OF INVENTION

The invention relates to managing access control within system topologies by using canonical access control representations. A method of the invention includes determining a set of accessor-accessible pairs. Each accessor of each pair has a predetermined level of access to the accessible of the pair within a system topology. A mathematically canonical set of zones is determined based on the set of accessor-accessible pairs. Each zone has one or more accessors and one or more accessibles. The canonical set of zones is used to manage the access control of the accessors and the accessibles within the system topology.

A system of the invention includes accessibles and accessors within a topology. Each accessor has a predetermined level of access to each of one or more of the accessibles, via all access control methods possible within the system topology. The system also includes a computer-readable medium storing data representing a mathematically canonical representation of access of the accessors to the accessibles. Each zone specifies accessor(s) having access to accessor(s).

The canonical representation satisfies at least three constraints. The first constraint specifies that, for each zone, each accessor of the zone have identical access to each accessible of the zone. The second constraint specifies that each accessible belong to no more than one of the zones. The third constraint specifies that the zones encompass the largest sets of the accessors that satisfy the first and the second constraints.

An article of manufacture of the invention includes a computer-readable medium and means in the medium. The means is for managing access of accessors within a system topology to accessibles within the system topology, by using a mathematically canonical set of zones. Each zone specifies accessor(s) having access to accessible(s). The canonical set of zones satisfy at least the same three constraint specified in the previous paragraph.

Other features and advantages of the invention will become apparent from the following detailed description of the presently preferred embodiment of the invention, taken in conjunction with the accompanying drawings.

BRIEF DESCRIPTION OF DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Overview: Constructing Canonical Representation

Figure 1:
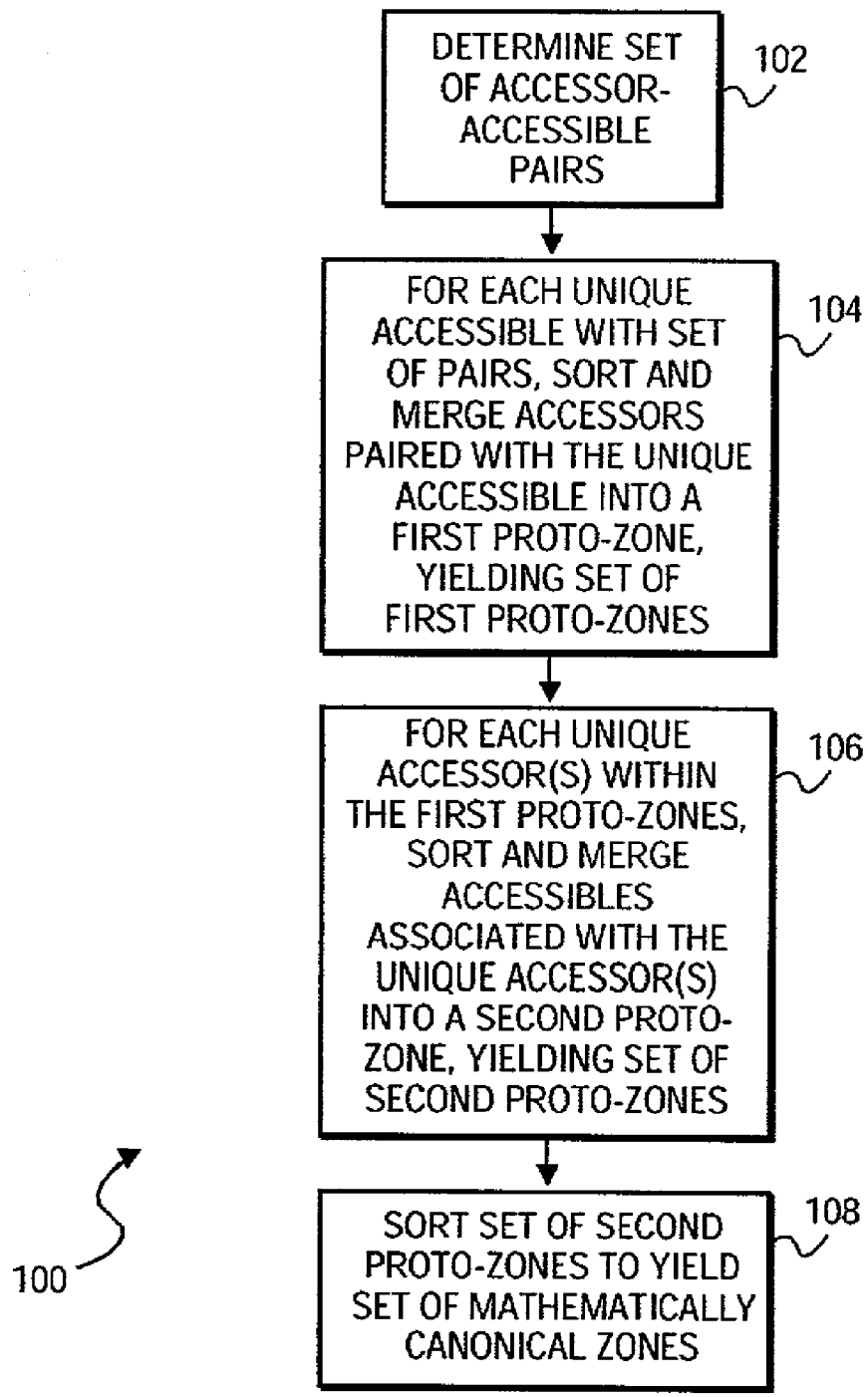
FIG. 1 is a flowchart of a method for representing access control within a system topology as a mathematically canonical set of zones, according to a preferred embodiment of the invention, and is suggested for printing on the first page of the patent.

FIG. 1 shows a method 100 for representing access control within a system topology in a mathematically canonical manner, according to an embodiment of the invention. The system topology in relation to which the method 100 is performed may be a storage-area network (SAN), or another type of system topology. At least some parts of the method 100, as well as other methods of the invention, can be implemented as means in a computer-readable medium of an article of manufacture. The medium may be a recordable data storage medium, a modulated carrier signal, or another type of medium.

For descriptive clarity, the following definitions and notations are provided. A zone is non-restrictively and generally a high-level abstraction of access control of one or more accessors to one or more accessibles that considers the effects of one or more access control methods. An accessor is non-restrictively and generally a unique identifying persistent attribute representing a consumer of a resource within a system topology that may have access to accessibles. An accessible is non-restrictively and generally a unique identifying persistent attribute representing a resource within the system topology.

More specifically, a zone is non-restrictively and generally a sorted set of accessor(s) and a sorted set of accessible(s) in which each accessor has the same predetermined level of access to each accessible. For example, all the accessors of a zone may have read-only or read-write access to all the accessibles of the zone. A configuration is non-restrictively and generally a mathematically canonical set of zero or more zones that specifies the access control of a system topology.

The notation A<integral number> represents an accessor, such as A1, whereas the notation R<integral number> represents an accessible, such as R1. A zone includes a set of accessors and a set of accessibles. Thus, a given zone may be specified as {{A1, A2, A3}, {R4, R5}}. This means that the accessors A1, A2, and A3 have the same level of access to the accessibles R4 and R5. A configuration is zero or more zones. Thus, a given configuration may be specified as {{{A1,}, {R4, R5}}, {{A4, A5}, {R6}}}.

In the method 100, the set of accessor-accessible pairs representing access within the system topology is first determined (102). An example of this set of pairs is {{A1,}, {A2, R1}, {A3, R1}, {A1, R2}, {A2, R2}, {A3, R3}}. The accessor of a given pair has a predetermined level of access to the accessible of the given pair, preferably by all access control methods possible within the system topology. For example, in the context of a SAN, the accessor A1 may have fabric access and physical connectivity to accessible R3, but may not have storage LUN masking access. Thus, the pair {A1, R3} is not included in the set of accessor-accessible pairs.

Next, for each unique accessible within the set of accessor-accessible pairs, the accessors paired with this unique accessible are sorted and merged into a first proto-zone (104). This yields a set of first proto-zones. In the previous example, there are three unique accessibles, R1, R2, and R3. For the accessible R1, the accessors A1, A2, and A3 are each paired with this accessible, yielding the first proto-zone {{A1, A2, A3}, R1}. For the accessible R2, the same three accessors are each paired with this accessible, yielding the first proto-zone {{A1, A2, A3}, R2}. For the accessible R3, only the accessor A3 is paired therewith, yielding the first proto-zone {{A3}, R3}.

For each unique subset of accessors within the set of first proto-zones, the accessibles associated with the unique set of accessors are then sorted and merged into a second proto-zone (106). This yields a set of second proto-zones. In the continuing example, there are two unique subsets of accessors, {A1, A2, A3} and {A3}. The former subset of accessors is associated with the accessibles R1 and R2, yielding the second proto-zone {{A1, A2, A3}, {R1, R2}}. The latter subset of accessors is associated only with the accessible R3, yielding the second proto-zone {{A3}, {R3}}. Finally, the set of second proto-zones are sorted to yield a mathematically canonical set of zones (108). Thus, the second proto-zones of the continuing example are sorted to yield the canonical set of zones {{A1, A2, A3}, {R1, R2}}, {{A3}, {R3}}}.

This set of zones can then be used to manage access control of accessors and accessibles within the system topology. For instance, as is described in a subsequent section of the detailed description, a current configuration of a canonical set of zones can be restored to a target configuration of another canonical set of zones. As another example, as is also described in a subsequent section of the detailed description, one configuration of a canonical set of zones may be compared to another configuration of a second canonical set of zones.

A mathematically canonical set of zones is mathematically canonical preferably because it satisfies the following three constraints. The first constraint is that every accessor of the subset of accessors specified in the zone has the same predetermined level of access to every accessible of the subset of accessibles specified in the zone. The second constraint is that an accessible can belong to at most only one zone. The third constraint is that the zone contains the largest set of accessors that satisfy the first and the second constraints. The method 100 generates a mathematically canonical set of zones that satisfy these three constraints.

Technical Background: Example Systems

Figure 2:
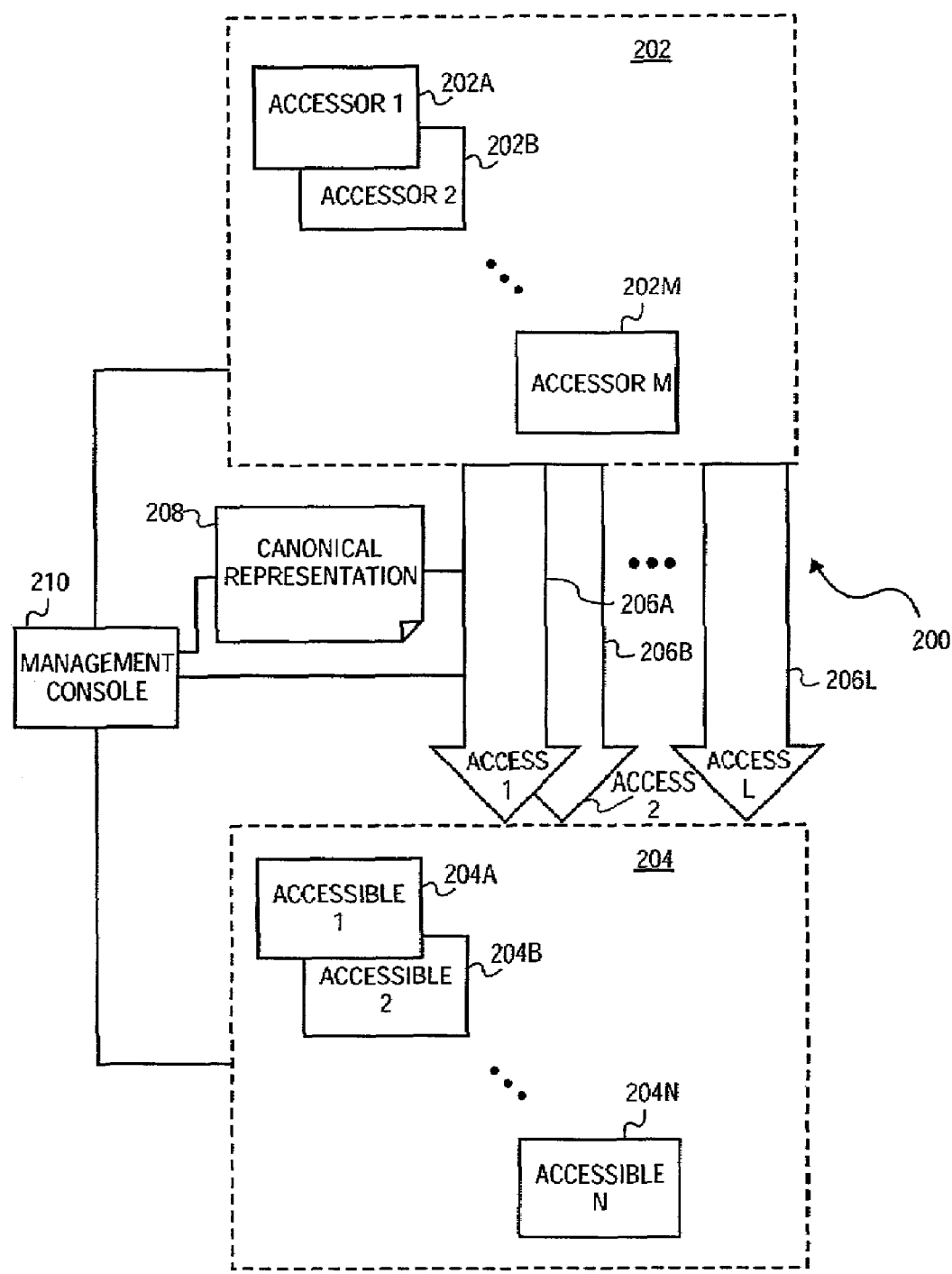
FIG. 2 is a block diagram of a generic system topology in conjunction with which embodiments of the invention may be implemented.

FIG. 2 shows a block diagram of an example generic system 200 in accordance with which embodiments of the invention may be practiced. The system 200 has a number of accessors 202A, 202B, . . . , 202M that are collectively referred to as the accessors 202. The system 200 also has a number of accessibles 204A, 204B, . . . , 204N that are collectively referred to as the accessibles 204. The number of the accessors 202 may be greater than, less than, or equal to the number of the accessibles 204. The individual accessors in accessors 202 have different levels of access to individual accessibles in accessibles 204 for each of the access control methods 206A, 206B, . . . , 206L possible within the system topology.

The canonical representation 208 may be stored as data on a computer-readable medium, and represents the access that the individual accessors in the accessors 202 have to individual accessibles in the accessibles 204 for each of the access control methods 206A, 206B, ... 206L. This canonical representation 208 is preferably zero or more zones, such as a canonical set of zones, as can be generated by following the method 100 of FIG. 1. More generally, the canonical representation 208 is mathematically canonical and preferably satisfies the three constraints that have been described.

The management console 210 is preferably a computer, such as a client or a server, by which an administrator manages access control between the accessors 202 and the accessibles 204 using the canonical representation 208. The console 210 may be that which constructs the canonical representation 208. The canonical representation 208 may be restored to a previously constructed canonical representation, or configuration, and may also be compared to another canonical representation, or configuration. Although the console 210 is separate to the accessors 202 in FIG. 2, it may also be implemented as one of the accessors 202.

The system 200 may be a storage-area network (SAN), or another type of system, the access control of which the management console 210 manages by using the canonical representation 208. For instance, the system 200 may be a communications network. The accessors of such a network are individual clients and/or users, whereas the accessibles are the resources accessible by the clients and/or users. Such resources may include physical assets like servers, printers, and so on, as well as logical assets such as web sites. The access control methods may include local-area network (LAN) access, wide-area network (WAN) access, dial-up access, virtual private network (VPN) access, as well as other types of access.

Restoring Current Configuration to Target Configuration

Figure 3:
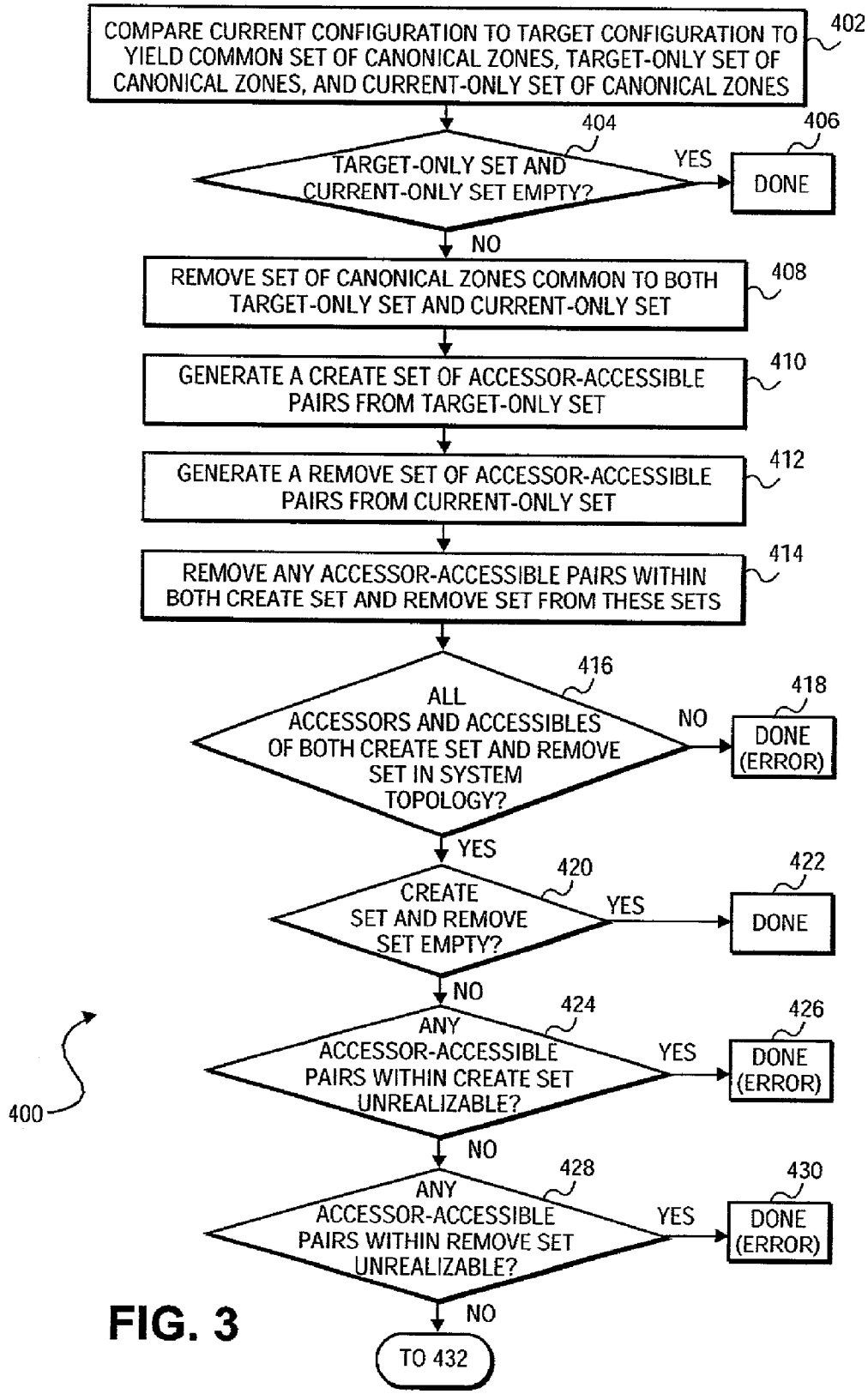
FIGS. 3 and 4 form a flowchart of a method for restoring a current configuration of access control within a system topology to a target configuration of access control within the system topology, according to an embodiment of the invention.
Figure 4:
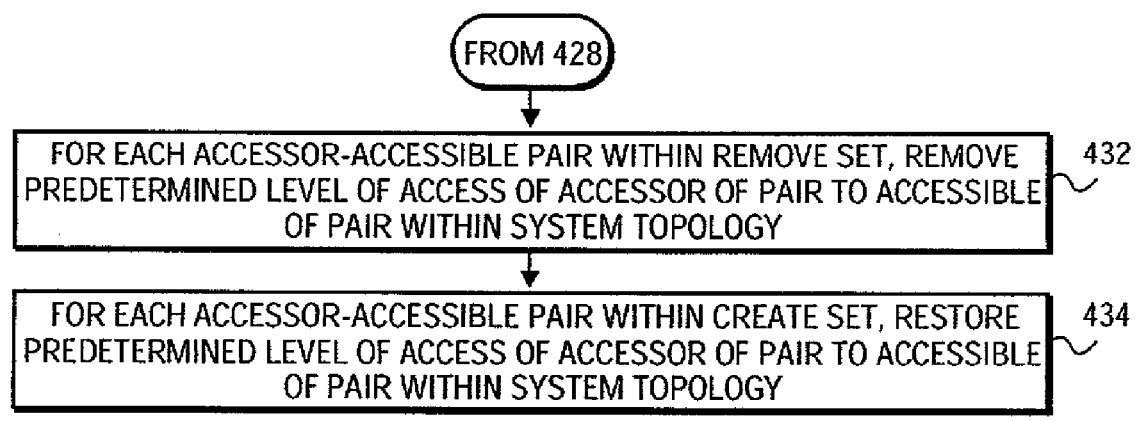

FIGS. 3 and 4 shows a method 400 for restoring a current configuration of access control to a target configuration of access control within a system topology, according to an embodiment of the invention. Each configuration includes a number of zones. For example, the current configuration may have the canonical set of zones $\{\{\{A1,\}, \{R4\}\}, \{\{A2, A3\}, \{R5\}\}, \{\{A1,\}, \{R1, R2, R3\}\}\}$, whereas the target configuration may have the canonical set of zones $\{\{\{A1\}, \{R4,\}\}, \{\{A1,\}, \{R1, R2, R3\}\}\}$. The method 400 describes how the current configuration can be restored to the target configuration.

First, the current and the target configurations are compared to one another to yield a common canonical set of zones, a canonical set of zones in the target configuration only, and a canonical set of zones in the current configuration only (402). The second set is referred to as the target-only canonical set of zones, whereas the third set is referred to as the current-only canonical set of zones. In the example, the common canonical set of zones is $\{\{\{A1, A2, A3\}, \{R1, R2, R3\}\}\}$. The target-only canonical set of zones is $\{\{\{A1\}, \{R4, R5\}\}\}$, whereas the current-only canonical set of zones is $\{\{\{A1, A2\}, \{R4\}\}, \{\{A2, A3\}, \{R5\}\}\}$.

If the target-only set and the current-only canonical set of zones are both empty (404), then the method 400 is done (406), since all the zones of the target and the current configurations are part of the common canonical set of zones. Otherwise, the canonical set of zones that are common to the target-only and current-only canonical sets of zones are removed from both target-only canonical set of zones and current-only set canonical of zones (408).

A set of accessor-accessible pairs is generated from the target-only canonical set of zones (410), which is referred to as the create set of pairs, and a set of accessor-accessible pairs is generated from the current-only canonical set of zones (412), which is referred to as the remove set of pairs. To yield the target configuration, access needs to be permitted between accessor and accessible in each accessor-accessible pair of the create set and access needs to be denied between accessor and accessible in each accessor-accessible pair of the remove set. In the example, the create set of pairs is $\{\{A1, R4\}, \{A1,\}\}$, and the remove set of pairs is $\{\{A1, R4\}, \{A2, R4\}, \{A2, R5\}, \{A3, R5\}\}$. The pairs are generated in 410 and 412 by expanding the target-only set and the current-only canonical set of zones, respectively, in an iterative manner.

Any accessor-accessible pairs within both the create set and the remove set of pairs are then removed from each set (414), since such pairs cancel one another. In the example, the pair $\{A1, R4\}$ is common to both the create and the remove set of accessor-accessible pairs, and is removed from each of these sets. The create set of pairs results in $\{\{A1, R5\}\}$, whereas the remove set of pairs results in $\{\{A2, R4\}, \{A2, R5\}, \{A3,\}\}$. Once the access control represented by each pair in the create set is created in the system topology, and once the access control represented by each pair in the remove set is removed from the system topology, the current configuration is transformed into the target configuration.

Before creating and removing these access controls, however, a number of verifications are performed. First, all the accessor and accessibles of the create set and the remove set are verified to ensure that they are in the system topology (416). If not, then the method 400 finishes with error (418). This is because if the accessors and the accessibles that are the subject of the access control represented by the pairs in the create and the remove sets are physically not present within the system, then these access controls cannot be created or removed.

Second, if both the create set and the remove set of accessor-accessible pairs are empty (420), then no access control needs to be created or removed, such that the method 400 is finished (422). Third, the accessor-accessible pairs within specifically the create set are examined to ensure that the access control they represent is realizable within the system (424). If any pair represents access control that is unrealizable within the system, then the method 400 finishes with error (426). An accessor-accessible pair within the create set of pairs may represent an unrealizable access control for a number of different reasons, depending on the type of system in which access control is being managed. Three types of such unrealization in particular are described later in the detailed description.

Finally, the accessor-accessible pairs within specifically the remove set are examined to ensure that the access control they represent is realizable within the system (428). If any pair represents access control that is unrealizable within the system, then the method 400 finishes with error (430). An accessor-accessible pair within the remove set of pairs may represent an unrealizable access control for a number of different reasons, depending on the type of system in which access control is being managed. Three types of such unrealization in particular are described later in the detailed description.

If the four verifications pass, then the access control represented by the accessor-accessible pairs of the remove set is removed from the system topology (432). Specifically, for each accessor-accessible pair within the remove set of pairs, the predetermined level of access of the accessor of the pair to the accessible of the pair is removed within the system topology. The manner by which such access control is removed may depend on the type of system in which access control is being managed. Preferably, such access control is removed for only one of the access control methods within the system.

Finally, the access control represented by the accessor-accessible pairs of the create set is created within the system topology (434). Specifically, for each accessor-accessible pair within the create set of pairs, a predetermined level of access of the accessor of the pair to the accessible of the pair is created with the system topology. The manner by which such access control is added may also depend on the type of system in which access control is being managed. Preferably, but not necessarily, such access control is added for all access control methods within the system.

Figure 5:
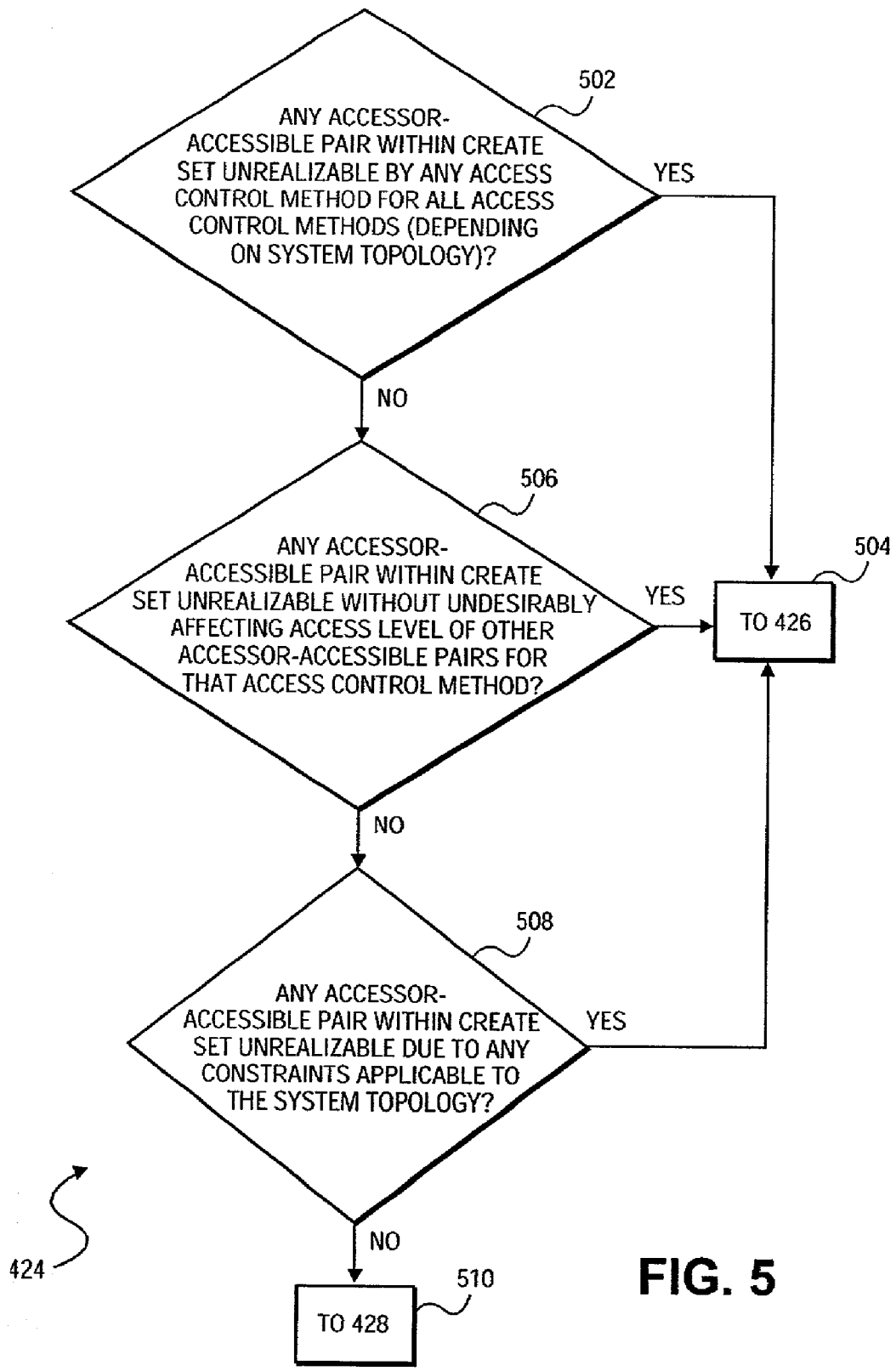
FIG. 5 is flowchart of a method for particularly determining whether any accessor-accessible pairs within the create set of pairs are unrealizable in the current configuration of access control, as performed in the method of FIGS. 3 and 4, according to a specific embodiment of the invention.

FIG. 5 shows one implementation of determining whether any accessor-accessible pair within the create set of pairs is unrealizable, according to an embodiment of the invention. That is, FIG. 5 shows one approach for implementing 424 of the method 400 of FIGS. 3 and 4. First, if any accessor-accessible pair within the create set is unrealizable by any access control method in one scenario, or all access control methods in another scenario (502), then preferably restoring the current configuration to the target configuration cannot be completed, such that the method 400 proceeds to 426 (504). The former scenario is for the system topology in which creation of access requires it to be realizable by all access control methods, whereas the latter scenario is for the system topology in which creation of access requires it to be realizable by just one access control method.

Next, if any accessor-accessible pair within the create set of pairs is unrealizable if realizing it by using a access control method results in undesirable effects (506), then restoring the current configuration to the target configuration cannot be completed, such that the method 400 proceeds to 426 (504). More specifically, such undesirable effects include undesirably affecting the access level of any other accessor-accessible pair in the create set, remove set or the set common to both current and target configurations for the access control method in questions.

An example is illustrative of such undesirable affectation. An access control method might allow at most only one accessor to access a given accessible. If a current accessor already has access to this accessible by this access control method, then the create set cannot specify that another accessor have access to this accessible. This is because doing so would undesirably affect the current accessor's access to the accessible, in effect terminating such access.

Finally, if any accessor-accessible pair within the create set is unrealizable due to any constraints applicable to the system topology (508), then preferably restoring the current configuration to the target configuration cannot be completed, such that the method 400 proceeds to 426 (504). Thus, 508 examines the dependencies between accessors-accessible pairs within access control methods, where such dependencies are present. That is, where adding access of an accessor to an accessible via an access control method undesirably affects the existing access of another accessor to the accessible, then unfeasible affectation results, and restoring the current configuration to the target configuration cannot be completed. If, however, all the unrealization tests of 424 in FIG. 5 succeed, then the method 400 proceeds to 428 (510), as has been described.

Figure 6:
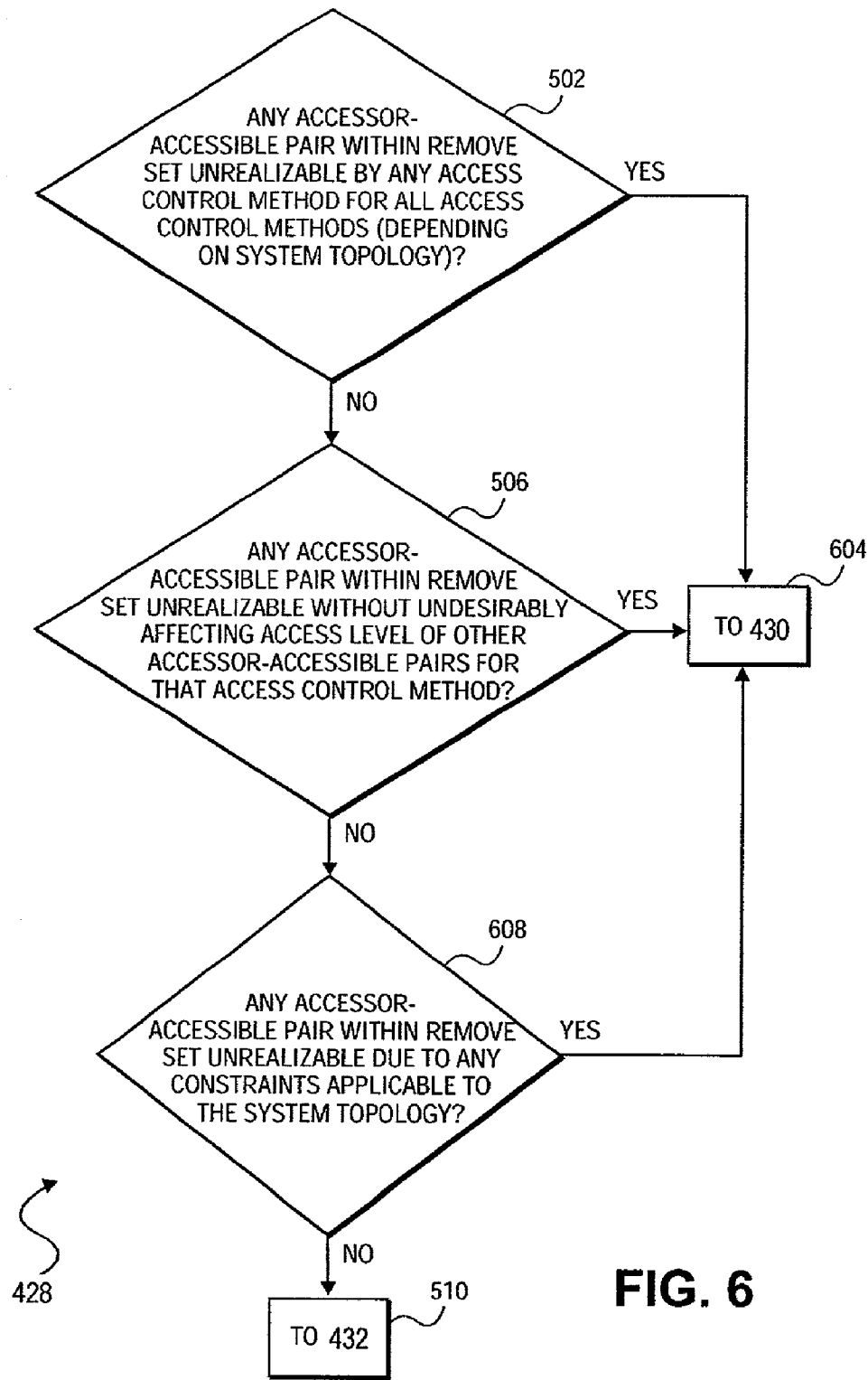
FIG. 6 is a flowchart of a method for particularly determining whether any accessor-accessible pairs within the remove set of such pairs are unrealizable in the current configuration of access control, as performed in the method of FIGS. 3 and 4, according to a specific embodiment of the invention.

FIG. 6 shows one implementation of determining whether any accessor-accessible pair within the remove set of pairs is unrealizable, according to an embodiment of the invention. That is, FIG. 6 shows one approach for implementing 428 of the method 400 of FIGS. 3 and 4. First, if any accessor-accessible pair within the remove set is unrealizable by any access control method in one scenario, or all access control methods in another scenario (602), then preferably restoring the current configuration to the target configuration cannot be completed, such that the method 400 proceeds to 430 (604). The former scenario is for the system topology in which creation of access requires it to be realizable by all access control methods, whereas the latter scenario is for the system topology in which creation of access requires it to be realizable by at least one access control methodNext, if any accessor-accessible pair within the remove set of pairs is unrealizable if realizing it by using a access control method results in undesirable effects (606), then restoring the current configuration to the target configuration cannot be completed, such that the method 400 proceeds to 430 (604). More specifically, such undesirable effects include undesirably affecting the access level of any other accessor-accessible pair in the create set, remove set or the set common to both current and target configurations for the access control method in questions.

An example is illustrative. There may be an accessor-accessible pair {A1, R2} that cannot be removed from the current configuration via a given access control method without also removing the pair {A2,} from the current configuration. As such, this access control method does not properly remove the pair {A1, R2}, since it also removes the pair {A2, R2}, and thus the access control method is not included in the access control methods determined in 602.

However, if the pair {A2, R2} is in the remove set of pairs anyway, then this access control method can nevertheless be used to remove the pair {A1, R2}. This is because the side effect of applying the access control method to remove the pair {A1,} the removal of the pair {A2, R2} does not matter, because the pair {A2,} is to be removed from the current configuration anyway. That is, applying the access control method feasibly removes the pair {A1, R2}, since the incidental removal of the pair {A2, R2} is nevertheless proper.

Finally, if any accessor-accessible pair within the remove set is unrealizable due to any constraints applicable to the system topology (608), then preferably restoring the current configuration to the target configuration cannot be completed, such that the method 400 proceeds to 430 (604). Thus, 608 examines the dependencies between accessors-accessible pairs within access control methods, where such dependencies are present. That is, where removing access of an accessor to an accessible via an access control method undesirably affects the existing access of another accessor to the accessible, then unfeasible affectation results, and restoring the current configuration to the target configuration cannot be completed. If, however, all the unrealization tests of 428 in FIG. 6 succeed, then the method 400 proceeds to 432 (610), as has been described.

Comparing First Configuration to Second Configuration

Figure 7:
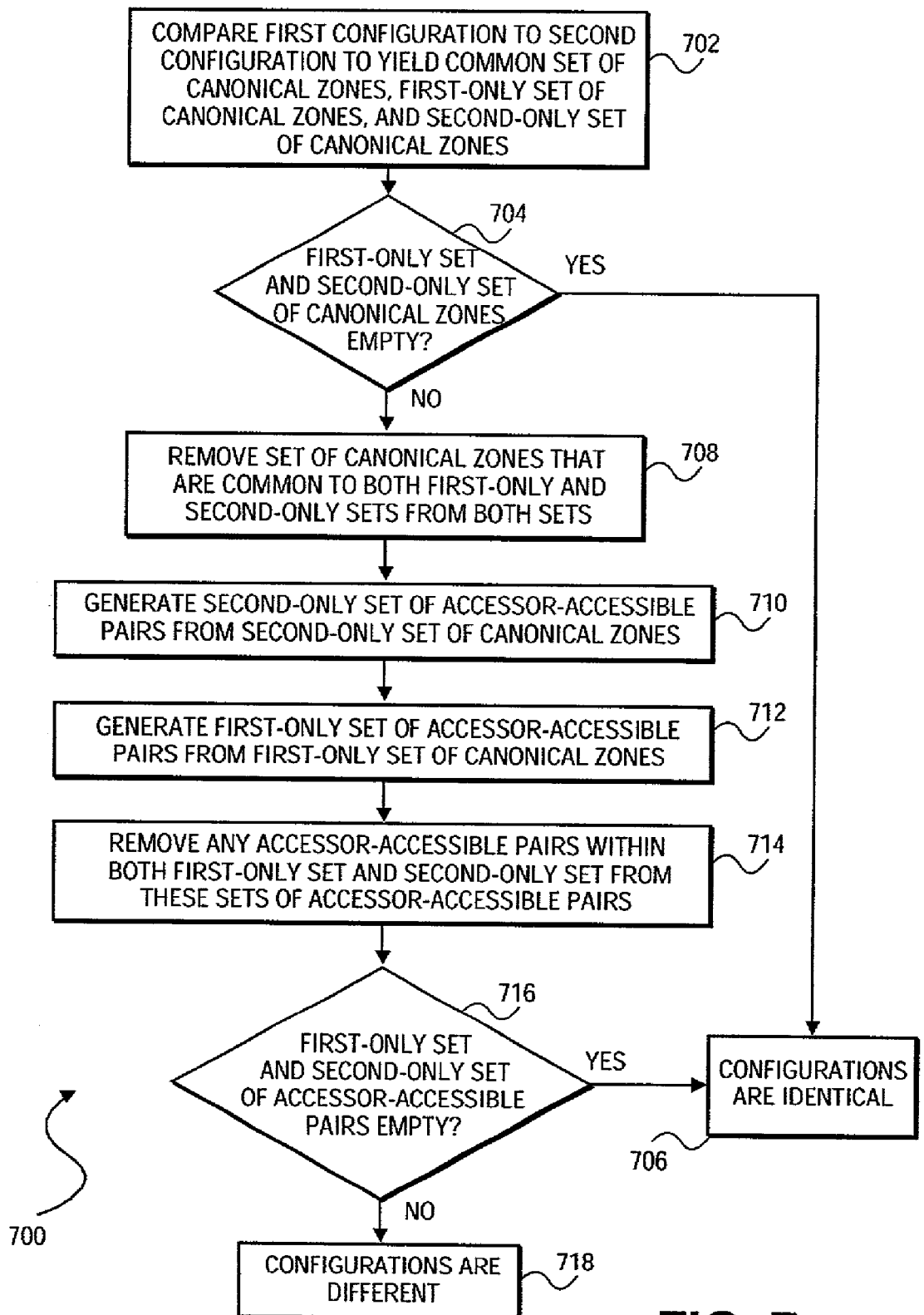
FIG. 7 is a flowchart of a method for comparing a first configuration of access control within a system topology to a second configuration of access control within the system topology, according to an embodiment of the invention.

FIG. 7 shows a method 700 for comparing a first configuration of access control to a second configuration of access control within a system topology, according to an embodiment of the invention. In at least some respects, the method 700 is a subset of and encompassed within the method 400 of FIGS. 3 and 4. Each configuration includes a number of zones. For example, the first configuration may have the canonical set of zones {{{A1,},{R4}}, {{A2, A3}, {R5}}, {{A1,}, {R1, R2, R3}}}, whereas the second configuration may have the canonical set of zones {{{A1}, {R4,}}, {{A1,}, {R1, R2, R3}}}.

First, the first and the second configurations are compared to one another to yield a common canonical set of zones, a canonical set of zones in the first configuration only, and a canonical set of zones in the second configuration only (702). The set of zones in the first configuration only is referred to as the first-only canonical set of zones, whereas the set of zones in the second configuration only is referred to as the second-only canonical set of zones. In the example, the common set of zones is {{{A1,}, {R1, R2, R3}}}. The second-only canonical set of zones is {{{A1}, {R4, R5}}}, whereas the first-only canonical set of zones is {{{A1, A2}, {R4}}, {{A2, A3}, {R5}}}.

If the first-only set and the second-only canonical set of zones are both empty (704), then the method 700 is done (706), concluding that the configurations are identical. Otherwise, the canonical set of zones that are common to both the first-only and second-only sets are removed from both those sets (708). A set of accessor-accessible pairs is generated from the second-only canonical set of zones (710), which is referred to as the second-only set of pairs, and a set of accessor-accessible pairs is generated from the first-only canonical set of zones (712), which is referred to as the first-only set of pairs. In the example, the second-only set of pairs is {{A1, R4}, {A1,}}, and the first-only set of pairs is {{A1, R4}, {A2, R4}, {A2, R5}, {A3, R5}}. The pairs are generated in 710 and 712 by expanding the second-only set and the first-only canonical set of zones, respectively, in an iterative manner.

Any accessor-accessible pairs within both the first-only set and the second-only set of pairs are then removed from each set (714). In the example, the pair {A1, R4} is common to both the first-only and the second-only set of accessor-accessible pairs, and is removed from each of these sets. The second-only set of pairs results in {{A1, R5}}, whereas the first-only set of pairs results in {{A2, R4}, {A2, R5}, {A3,}}. If the first-only set and the second-only set of pairs are both empty (716), then the method 700 is done, concluding that the configurations are identical (706). Otherwise, the method 700 is done, concluding that the configurations are different (718), with the first-only set and the second-only set of pairs indicating the differences.

Advantages Over the Prior Art

Embodiments of the invention allow for advantages over the prior art. The mathematically canonical representation of access control configurations allows for intelligent manipulation of such access control within system topologies. Restoring current configurations to target configurations can be accomplished by applying minimal changes to the current configuration. Comparison of access control information for two configurations is more accurate since comparison is made at a semantic level. Administrators and systems can thus manipulate access control configurations at an abstract, high level, without having to concern themselves with the manners by which such configurations were generated, since the mathematically canonical representations of a given configuration are identical regardless of the manner in which they were constructed.

Alternative Embodiments

It will be appreciated that, although specific embodiments of the invention have been described herein for purposes of illustration, various modifications may be made without departing from the spirit and scope of the invention. For instance, whereas the invention has in parts been specifically described in relation to a storage-area network (SAN), the invention is not particularly limited to SAN system topologies. The invention is thus amenable to system topologies other than SAN topologies.

Furthermore, whereas the invention describes access level between accessors and accessibles in terms of all or nothing access, the invention is not particularly limited to those levels of access and is thus amenable to other access levels. The method for restoring a current configuration to a target configuration described in this invention as an embodiment of the invention is described for a perfect restore. But, the invention is amenable to partial restoration wherein particular error conditions are ignored and the configuration is partially restored. Accordingly, the scope of protection of this invention is limited only by the following claims and their equivalents.

The invention claimed is:

1. A method comprising:
   determining a set of accessor-accessible pairs, each accessor of each accessor-accessible pair having a predetermined level of access to the accessible of the accessor-accessible pair within a system topology; and,
   determining a mathematically canonical set of zones based on the set of accessor-accessible pairs, each zone having one or more accessors and one or more accessibles, the mathematically canonical set of zones used to manage access control of accessors and accessibles within the system topology,
   wherein determining the mathematically canonical set of zones based on the set of accessor-accessible pairs comprises:
      for each unique accessible within the set of accessor-accessible pairs, sorting and merging accessors of the set of accessor-accessible pairs paired with the unique accessible as a first proto-zone, yielding a set of first proto-zones, each first proto-zone having one or more accessors and an accessible:
      for each unique one or more accessors within the set of first proto-zones, sorting and merging accessibles of the set of first proto-zones associated with the unique one or more accessors as a second proto-zone, yielding a set of second proto-zones, each second proto-zone having one or more accessors and one or more accessibles; and,
      sorting the set of second proto-zones to yield the mathematically canonical set of zones.

2. The method of claim 1, wherein determining the set of accessor-accessible pairs comprises determining each accessor-accessible pair, the accessor of each accessor-accessible pair having the predetermined level of access to the accessible of the accessor-accessible pair within the system topology according to each of one or more access control methods.

3. The method of claim 1, farther comprising restoring access control of the accessors and accessibles within the system topology from a current configuration of the mathematically canonical set of zones to a target configuration of a second mathematically canonical set of zones.

4. The method of claim 3, wherein restoring the access control from the current configuration to the target configuration comprises:
   comparing the current configuration to the target configuration to yield a target-only canonical set of zones within only the target configuration, and a current-only canonical set of zones within only the current configuration;
   removing zones common to both the target-only canonical set of zones and current-only canonical set of zones from both target-only and the current-only sets;
   generating a create set of accessor-accessible pairs from the target-only canonical set of zones;
   generating a remove set of accessor-accessible pairs from the current-only canonical set of zones;

removing any accessor-accessible pairs within both the create set and the remove set of accessor-accessible pairs from each of the create set and the remove set of accessor-accessible pairs;

for each accessor-accessible pair within the create set of accessor-accessible pairs, restoring the predetermined level of access of the accessor of the accessor-accessible pair to the accessible of the accessor-accessible pair within the system topology; and, for each accessor-accessible pair within the remove set of accessor-accessible pairs, removing the predetermined level of access of the accessor of the accessor-accessible pair to the accessible of the accessor-accessible pair within the system topology.

5. The method of claim 4, further comprising, after comparing the current configuration to the target configuration, ending the method upon determining that both the current-only set and the target-only canonical set of zones are empty.

6. The method of claim 4, further comprising, after removing any accessor-accessible pairs within both the create set and the remove set of accessor-accessible pairs, ending the method upon determining that the at least one of the create set and the remove set of accessor-accessible pairs includes a pair having at least one of an accessor and an accessible absent in the system topology.

7. The method of claim 4, further comprising, after removing any accessor-accessible pairs within both the create set and the remove set of accessor-accessible pairs, ending the method upon determining that both the create set and the remove set of accessor-accessible pairs are empty.

8. The method of claim 4, further comprising, after removing any accessor-accessible pair within both the create set and the remove set of accessor-accessible pairs, ending the method upon determining that at least one of any accessor-accessible pair within the create set of accessor-accessible pairs and any accessor-accessible pair within the remove set of accessor-accessible pairs cannot be realized within the system topology.

9. The method of claim 3, wherein determining that any accessor-accessible pairs within the create set of accessor-accessible pairs cannot be realized within the system topology comprises at least one of:

determining that any accessor-accessible pairs within the create set of accessor-accessible pairs cannot be realized according to each of one or more access control methods within the system topology, where for the system topology, creation of access requires the access to be realizable by all the access control methods);

determining that any accessor-accessible pairs within the create set of accessor-accessible pairs cannot be realized according to all of the one or more access control methods within the system topology, where for the system topology, creation of access requires the access to be realizable by any of the access control methods;

determining that any accessor-accessible pairs within the create set of accessor-accessible pairs cannot be realized according to any constraints applicable to the system topology;

determining that any accessor-accessible pairs within the create set of accessor-accessible pairs cannot be realized according to each of the one or more access control methods within the system topology, where for the system topology, creation of access requires the access to be realizable by all access control methods, without undesirably affecting the access level of any other accessor-accessible pair for the access control method; and, determining that any accessor-accessible pairs cannot be realized according to all of the one or more access control methods within the system topology, where for the system topology, creation of access requires the access to be realizable by any of the access control methods, without undesirably affecting the access level of any other accessor-accessible pair for the access control method.

10. The method of claim 3, wherein determining that any accessor-accessible pairs within the remove set of accessor-accessible pairs cannot be realized within the system topology comprises at least one of:

determining that any accessor-accessible pairs within the remove set of accessor-accessible pairs cannot be realized according to each of one or more access control methods within the system topology, where for the system topology, removal of access requires the access to be realizable by all the access control methods);

determining that any accessor-accessible pairs within the remove set of accessor-accessible pairs cannot be realized according to all of the one or more access control methods within the system topology, where for the system topology, removal of access requires the access to be realizable by any of the access control methods;

determining that any accessor-accessible pairs within the remove set of accessor-accessible pairs cannot be realized according to any constraints applicable to the system topology;

determining that any accessor-accessible pairs within the remove set of accessor-accessible pairs cannot be realized according to each of the one or more access control methods within the system topology, where for the system topology, removal of access requires the access to be realizable by all access control methods, without undesirably affecting the access level of any other accessor-accessible pair for the access control method; and, determining that any accessor-accessible pairs cannot be realized according to all of the one or more access control methods within the system topology, where for the system topology, removal of access requires the access to be realizable by any of the access control methods, without undesirably affecting the access level of any other accessor-accessible pair for the access control method.

11. The method of claim 1, further comprising comparing a first configuration of the mathematically canonical set of zones to a second configuration of a second mathematically canonical set of zones.

12. The method of claim 11, wherein comparing the first configuration to the second configuration comprises:

comparing the first configuration to the second configuration to yield at least a second-only canonical set of zones within only the second configuration, and a first-only canonical set of zones within only the first configuration, removing the canonical set of zones common to both the second-only canonical set of zones and first-only canonical set of zones from both the first-only and the second-only sets;

upon determining that both the first-only set and the second-only canonical set of zones are empty, concluding that the first configuration is identical to the second configuration;

otherwise,
generating a second-only set of accessor-accessible pairs from the second-only canonical set of zones;
generating a first-only set of accessor-accessible pairs from the first-only canonical set of zones;
removing any accessor-accessible pairs within both the first-only set and the second-only set of accessor-accessible pairs from each of the first-only set and the second-only set of accessor-accessible pairs;
upon determining that both the first-only set and the second-only set of accessor-accessible pairs are empty, concluding that the first configuration is identical to the second configuration; and,
otherwise, concluding that the first configuration and the second configuration are different, as indicated by the first-only set and the second-only set of accessor-accessible pairs.

13. A system comprising:
a plurality of accessibles within a topology accessible via at least one access control method;
a plurality of accessors within the topology, each accessor having a predetermined level of access to each of one or more of the plurality of accessibles via one or more of the at least one access control method; and,
a computer-readable medium storing data representing a mathematically canonical representation of access of the plurality of accessors to the plurality of accessibles, the representation including a set of zones, each zone specifying one or more of the plurality of accessors having access to one or more of the plurality of accessibles to define a set of accessor-accessible pairs,
wherein the set of zones is determined based on the set of accessor-accessible pairs, by:
for each unique accessible within the set of accessor-accessible pairs, sorting and merging accessors of the set of accessor-accessible pairs paired with the unique accessible as a first proto-zone, yielding a set of first proto-zones, each first proto-zone having one or more accessors and an accessible;
for each unique one or more accessors within the set of first proto-zone, sorting and merging accessibles of the set of first proto-zones associated with the unique one or more accessors as a second qroto-zone, yielding a set of second proto-zone, each second proto-zone having one or more accessors and one or more accessibles; and,
sorting the set of second proto-zones to yield the mathematically canonical set of zones.

14. The system of claim 13, further comprising a console by which the access of the plurality of accessors to the plurality of accessibles as represented by the mathematically canonical representation is manageable.

15. The system of claim 14, wherein the console is one of the plurality of accessors.

16. The system of claim 14, wherein the console permits a current configuration of the mathematically canonical representation to be restored to a target configuration of a second mathematically canonical representation.

17. The system of claim 13, wherein the topology comprises one of: a storage-area network, and a communications network.

18. An article of manufacture comprising:
a tangible computer-readable data storage medium; and,
means in the medium for managing access of a plurality of accessors within a system topology to a plurality of accessibles within the system topology by using a mathematically canonical set of zones, each zone specifying one or more of the plurality of accessors having access to one or more of the plurality of accessibles to define a set of accessor-accessible pairs,
the canonical set of zones satisfying a plurality of constraints comprising:
a first constraint specifying that, for each zone, each of the one more accessors of the zone has identical access to each of the one or more accessibles of the zone;
a second constraint specifying that each of the plurality of accessibles belongs to no more than one zone; and,
a third constraint specifying that the canonical set of zones encompasses largest sets of the plurality of accessors that satisfy the first and the second constraints,
wherein the set of zones is determined based on the set of accessor-accessible pairs, by:
for each uniciue accessible within the set of accessor-accessible pairs, sorting and merging accessors of the set of accessor-accessible pairs paired with the unique accessible as a first proto-zone, yielding a set of first proto-zones, each first proto-zone having one or more accessors and an accessible;
for each unique one or more accessors within the set of first proto-zones, sorting and meraing accessibles of the set of first proto-zones associated with the unique one or more accessors as a second proto-zone, yielding a set of second proto-zones, each second proto-zone having one or more accessors and one or more accessibles; and,
sorting the set of second proto-zones to yield the mathematically canonical set of zones.

19. The method of claim 1, wherein the mathematically canonical set of zones satisfies a plurality of constraints comprising:
a first constraint specifying that, for each zone, each of the one more accessors of the zone has identical access to each of the one or more accessibles of the zone;
a second constraint specifying that each of the plurality of accessibles belongs to no more than one of the at least one zone; and,
a third constraint specifying that the at least one zone encompass largest sets of the plurality of accessors that satisfy the first and the second constraints.

20. The system of claim 13, wherein the canonical representation satisfies a plurality of constraints comprising:
a first constraint specifying that, for each zone, each of the one more accessors of the zone has identical access to each of the one or more accessibles of the zone;
a second constraint specifying that each of the plurality of accessibles belongs to no more than one of the at least one zone; and,
a third constraint specifying that the at least one zone encompass largest sets of the plurality of accessors that satisfy the first and the second constraints.

* * * * *